United States Patent [19]

Sosnowski et al.

[11] Patent Number: 4,572,053
[45] Date of Patent: Feb. 25, 1986

[54] ORDNANCE EJECTOR SYSTEM

[75] Inventors: Joseph A. Sosnowski, Norristown; Gary Black, Hatfield; Robert J. Pritchard, Lansdale, all of Pa.

[73] Assignee: Teleflex Incorporated, Limerick, Pa.

[21] Appl. No.: 583,718

[22] Filed: Feb. 27, 1984

[51] Int. Cl.⁴ .............................................. F41F 5/02
[52] U.S. Cl. .................................. 89/1.51; 74/89.15; 227/131; 244/137 R
[58] Field of Search ...................... 89/1.51, 1.54, 1.57; 74/89.15, 572, 2; 244/137 A; 227/131; 173/117

[56] References Cited

U.S. PATENT DOCUMENTS

| | | | |
|---|---|---|---|
| 2,499,712 | 3/1950 | Armstrong | 89/1.51 X |
| 2,829,561 | 4/1958 | Granfelt | 89/1.51 |
| 2,992,594 | 7/1961 | Anderson et al. | 89/1.51 X |
| 3,924,692 | 12/1975 | Saari | 173/117 |
| 3,983,783 | 10/1976 | Maxey | 89/1.57 |
| 4,031,805 | 6/1977 | Puttinger et al. | 89/1.58 |
| 4,042,036 | 8/1977 | Smith | 227/131 X |
| 4,129,240 | 12/1978 | Geist | 227/131 X |
| 4,149,430 | 4/1979 | F'Geppert | 74/89.15 X |
| 4,323,127 | 4/1982 | Cunningham | 227/131 X |
| 4,487,173 | 12/1984 | Maucher et al. | 74/572 X |

Primary Examiner—David H. Brown
Attorney, Agent, or Firm—Harold W. Milton, Jr.

[57] ABSTRACT

An energy storage and release system (10) in combination with an aircraft (11) for ejecting an ordnance from the aircraft, the system (10) including a housing (22) mounted in the aircraft (11) and a drive shaft (24) having an outer end (26) and inner end (28) supported within the housing (22) for reciprocating axial movement of the outer end (26) into and out of the housing (22). An energy storage system including a flywheel (30) rotatably mounted within the housing (22) and operatively connected to the drive shaft (24) moves the outer end (26) of the drive shaft (24) axially out of the housing (22) to eject an ordnance (18). A linear induction motor (16) powers the flywheel (30).

24 Claims, 5 Drawing Figures

ORDNANCE EJECTOR SYSTEM

TECHNICAL FIELD

The subject invention relates to an energy storage and release system for providing sufficient force to accelerate an ordnance from a rack unit.

BACKGROUND ART

Standard design bomb rack units have been either passive in nature in that the units utilizae a gravity release system or the units incorporated the use of a pyrotechnique cartridge to actively discharge the ordnance away from the carrier rack and parent aircraft. More recently, high pressure hydraulics have been used to serve as the activating agents alone or in combination with the pyrotechnique devices. The gravity release systems are sufficiently effective at flight speeds significantly below subsonic flight but as the aircraft approaches sonic speeds and more importantly transsonic and supersonic speeds, the gravity release systems are inadequate. Due to the aerodynamic considerations of jet aircraft wings, gravity release systems are no longer accurate and under varying conditions of ordnance mix and flight profiles, these systems generate situations that are extremely hazardous and could even be fatal to the aircraft and pilot. Due to the structure of the wings, the ordnance can be drawn into the air currents around the wing after gravity release creating an ultrahazardous condition and a totally ineffective, inaccurate release.

The pyrotechnique active release systems accelerate the ordnance away from the aircraft to alleviate the above mentioned problems. Such devices use controlled explosion of a cartridge. Such systems have several inherent problems. Human error in loading the explosive cartridge can result in nondeployment of the ordnance. Presently used cartridges vary widely in energy output resulting in significantly different ordnance ejection profiles and velocities. An important factor is the violent release of energy from the cartridges being extremely detrimental to the chambers and breaches which are used to contain and direct the energy to useful work. The result is frequent overhaul requirements of the ejector units.

The combination of pyrotechniques and hydraulics solves several of the problems associated with pyrotechnique use but still have several major drawbacks inherent to all pyrotechnique systems. Any device using a pyrotechnique ejector cannot be tested to ordnance release. Additionally, the problems detailed above remain in such a combination unit to some extent.

High pressure hydraulics have provided positive results in laboratory experimentation. However, the use of high pressure hydraulics is not consistent with the move in the industry from hydraulics and pneumatics toward an all electric aircraft. Additionally, such devices have all of the problems inherent in a hydraulic system such as leakage and maintenance.

The instant invention is a departure from the prior means for ejecting an ordnance which overcomes the shortcomings of the pyrotechnique, hydraulic, and hybrid release systems.

SUMMARY OF INVENTION AND ADVANTAGES

According to the present invention there is provided an energy storage and release system for an ordnance ejection system including a housing and a driven member supported within the housing for reciprocating axial movement into and out of the housing. Energy storage means stores energy within the system to move the drive shaft in the axial direction out of the housing. Energy input means powers the energy storage means. Clutch means converts the kinetic energy of the energy storage means to mechanical movement of the driven member and maintains constant linear velocity of the movement as the kinetic energy is dissapated from the energy storage means to a lower level.

Preferably, the energy storage means includes a flywheel operatively connected to the driven shaft through the clutch means. The use of a flywheel as a primary source of energy provides many salient features to the system. The use of the flywheel provides high energy storage, rapid energy release, and simple control of applied forces. The clutch means provides a fail safe energy release wherein unspent energy can be dissipated through the free wheeling flywheel at the end of a stroke. This system is quite adaptable to speed control for variable force application. The flywheel drive source is well adapted to available electric power. Regarding the ejection function, the flywheel and clutch means are well suited for an impulsive and hence short duration of energy discharge required to accelerate the ordnance. Such a system is also well suited for the different force applications for optimal release velocities of various configuration ordnances.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
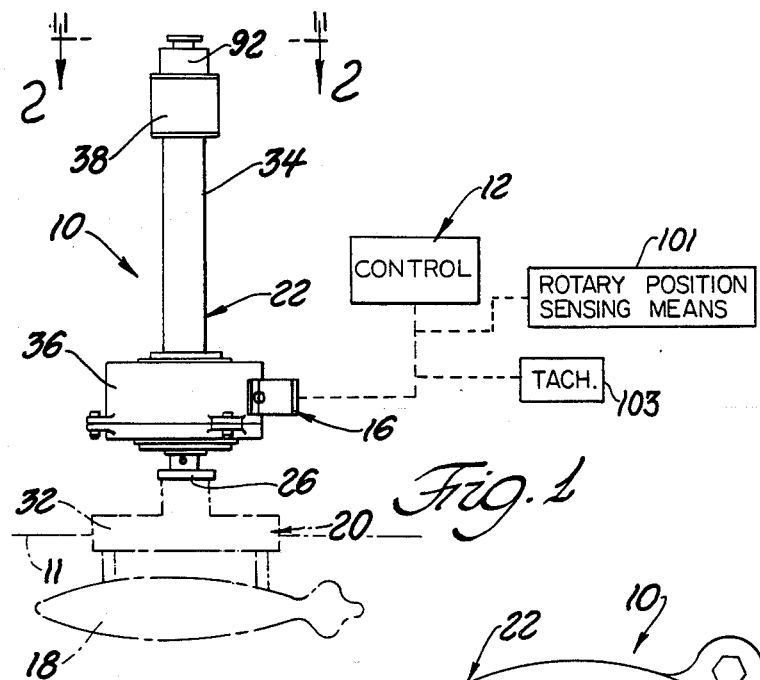
FIG. 1 is a side view of the subject ejection system in combination with the schematically shown ordnance ejection system of an aircraft.
Figure 2:
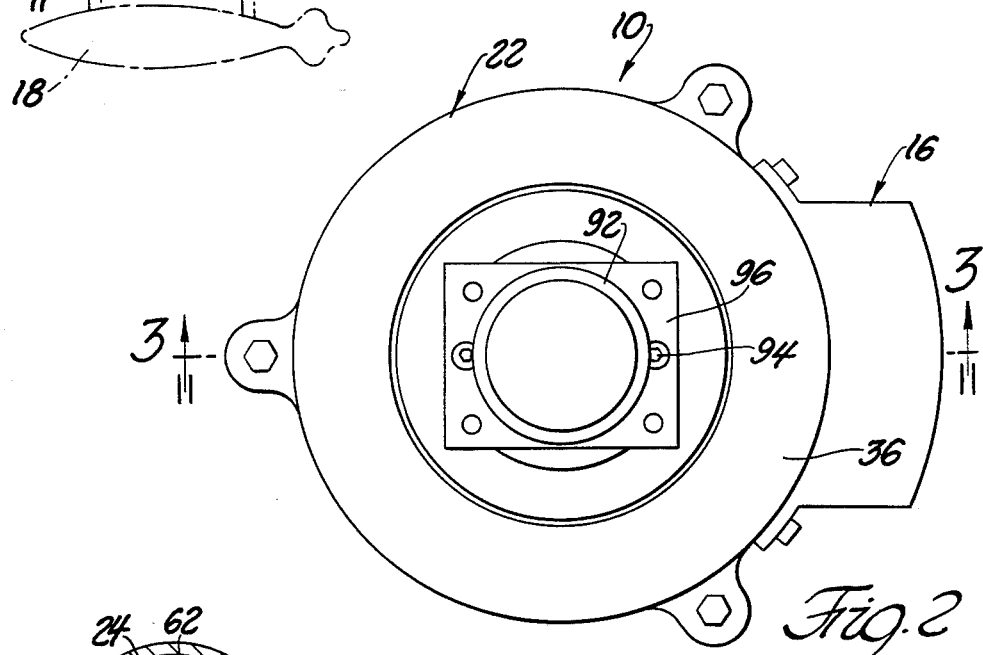
FIG. 2 is a top plan view taken substantially along lines 2—2 of FIG. 1.
Figure 4:
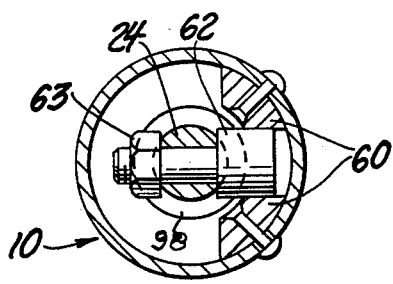
FIG. 4 is a sagital cross sectional view taken substantially along lines 4—4 of FIG. 3.
Figure 5:
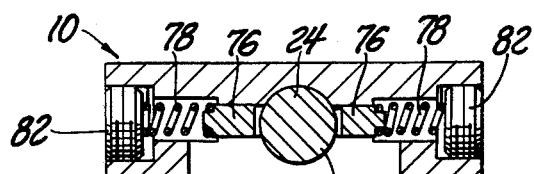
FIG. 5 is a sagital cross sectional view taken substantially along lines 5—5 of FIG. 3.

An energy storage and release system for an ordnance ejection system is generally shown at 10. As shown in FIG. 1, the major components of the ordnance ejection system in combination with an aircraft 11 are the control means of the aircraft 11 schematically shown at 12, the energy storage and release system 10 and energy input means generally indicated at 16 for powering the energy storage and release system 10. An ordnance 18 is supported from a rack of the aircraft generally indicated at 20 which is operatively connected to the energy storage and release system 10.

The aircraft 11 includes a housing generally indicated at 22 for containing the system 10. The system 10 includes a drive shaft 24 supported within the housing 22 for reciprocating axial movement into and out of the housing 22. The drive shaft 24 has an outer end 26 and an inner end 28. The system 10 includes the energy storage means for storing energy within the system 10 to move the drive shaft 24 in the axial direction out of the housing 22 and the energy input means 16 for powering the energy storing means. The system 10 is characterized by including clutch means for converting the kinetic energy of the energy storage means to mechanical movement of the drive shaft 24 and for maintaining constant linear velocity of the mechanical movement as the kinetic energy is dissipated from the energy storage means to a lower level.

The energy storage means includes a flywheel 30 rotatably mounted within the housing 22 and operatively connected to the drive shaft 24 through the clutch means for moving the outer end 26 of the drive shaft 24 axially out of the housing 22 to eject the ordnance. As schematically shown in FIG. 1, a force splitting mechanism 32 may be utilized.

The housing 22 has a central tubular portion 34, an outside end cage 36, and an inside end cage 38. The flywheel 30 is supported for rotation in the outer end cage 36 by ball bearings 40 retained within takeup collars 42. The ball bearings 40 must be of the heavy-duty high speed type that are properly preloaded to absorb both the high thrust load and the running hanging load of the components involved. The ball bearings 40 are sealed within the takeup collars 42. The drive shaft 24 is supported within guide bushings 44. End members 46 and 48 secure the components within the end cage 36 and are retained thereon by bolts 49.

Figure 3:
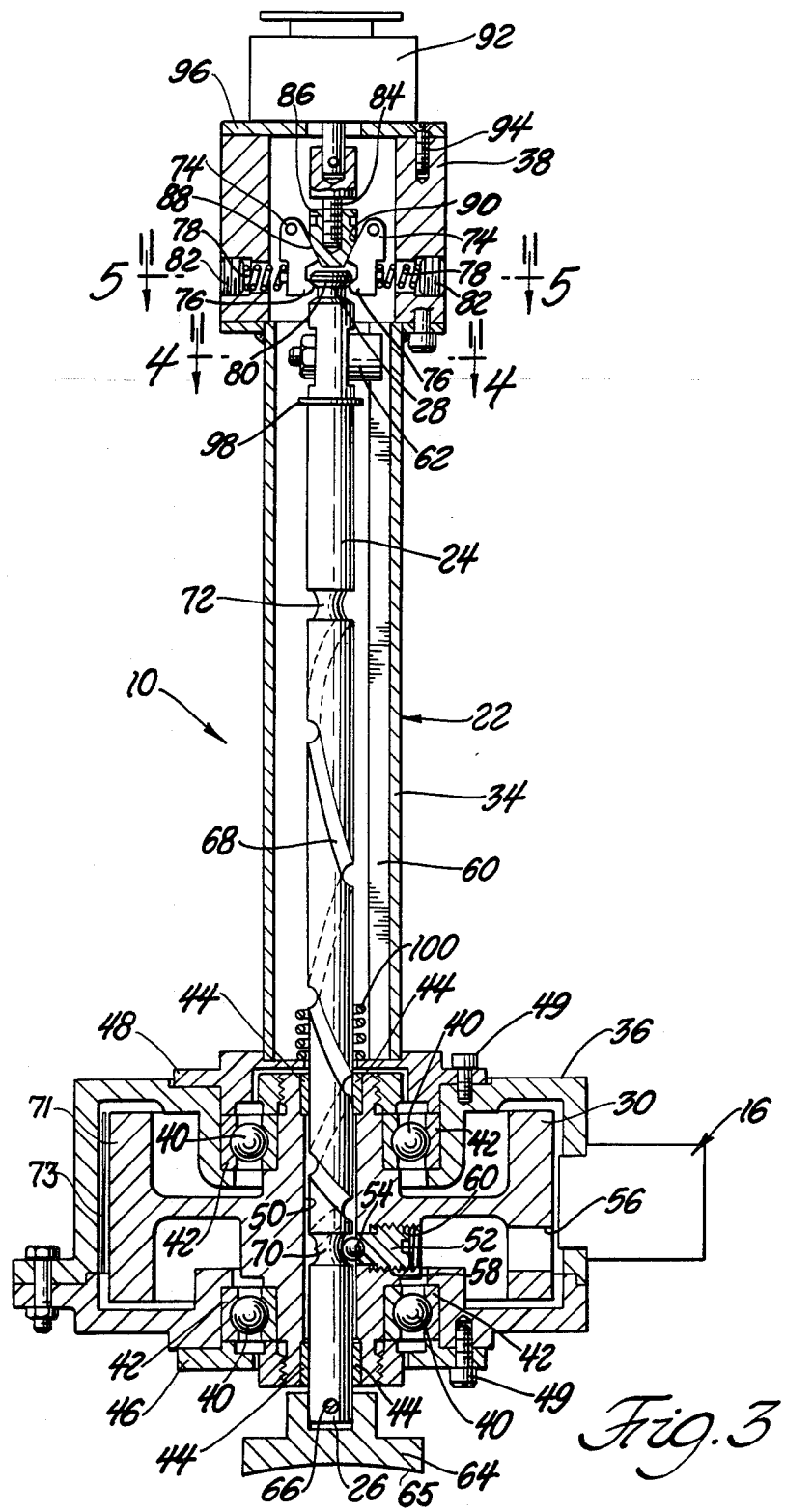
FIG. 3 is a cross sectional view taken substantially along lines 3—3 of FIG. 2.

The clutch means includes a threaded outer portion of the drive shaft (24) surface defining a ball drive shaft 24. The flywheel 30 includes a central bore 50 therethrough. A cage in the form of a hardened housing 52 is disposed adjacent the bore 50. A ball 54 is rotatably mounted in the housing 52 and has a surface exposed within the bore 50 in contact with the ball drive shaft 24. The ball 54 is guided inside the hardened housing 52 to withstand reactive loads and to attain proper ball adjustment relative to the threaded shaft 24. As shown in FIG. 3, the flywheel 30 includes an opening 56 therethrough to allow access to the housing 52. The housing 52 has a threaded outer surface 58 which is mounted within a threaded opening 60 in the flywheel to allow adjustment of the housing 52 relative to the flywheel 30 thereby allowing adjustment of the ball 54 relative to the shaft 24.

It has been determined that the base requirement of storing sufficient energy to subsequently accelerate a 500 pound store to a final velocity of 20 feet per second within a distance of 6 inches is required in most ordnance ejection system. Assuming that a constant force system is necessary so that the limit loads of the ordnance are not exceeded, it is necessary to apply a constant force of 6250 pounds for 50 milliseconds. For a steel flywheel in the shape of a 1.5 inch high cylinder with a radius of 3.5 inches and a thickness of 0.5 inches, the required angular velocity to store 5,000 joules which is sufficient to accomplish the desired work is determined to be 8191 revolutions per minute. The 5,000 joules of stored energy is not an inherent limitation of the instant invention. Much higher levels are possible simply by increasing the speed or moment of inertia of the storing flywheel. Additionally, variable forces can be applied to the ordnance 18 by simply varying the speed of the flywheel 30.

The system 10 includes shaft rotation restricting means for restricting rotation of the ball drive shaft 24 whereby rotation of the flywheel 30 drives the the ball drive shaft 24 out of the housing 22 as the ball 54 follows the threaded outer surface of the ball drive shaft 24. The shaft rotation restricting means includes an anti-torquing tube 60 mounted within the tubular portion 34 of the housing 22. A cam follower 62 is fixedly secured to the ball drive shaft 24 and is secured to the shaft 24 by nut 63. The cam follower 62 slidably engages the anti-torquing tube 60 for following the tube 60 as the ball drive shaft 24 reciprocally moves within the housing 22. The ball drive shaft 24 is prevented from rotating with the flywheel 30, permitting the shaft 24 to be driven against the ordnance 18.

An adapter 64 is mounted on the end of the shaft 24 by pin 66. The adapter 64 is configured to suit the type of ordnance involved. The adapter 64 may also contain any shock absorption device 65 known in the art considered necessary. The initial position of the ball drive shaft 24 and adapter 64 is not in direct contact with the ordnance 18 but will be buffered through a compressive material to permit the ball drive shaft 24 and adapter 64 to be activated under conditions of lower reactive forces than those to be encountered from the ordnance 18.

The ball drive shaft 24 includes a groove 68 defining the threaded outer surface of the shaft 24. The groove 68 is a variable pitch groove 68 forming an increasing pitch substantially from the outer end 26 toward the inner end 28 of the ball drive shaft 24 for providing a linear constant force transfer from the ball drive shaft 24 to the ordnance 18. A difficult aspect of the flywheel based ordnance ejection system is not in the storage of the energy but the ability to repeatedly release this energy in a controlled fashion in times on the order of 50 milliseconds. The variable pitch groove 68 in combination with the ball drive flywheel 30 provides an effective transfer of the energy from the flywheel 30 to produce useful work. Such a configuration dissipates substantially all of the energy stored in the flywheel 30 in a controlled manner. The combination of components permits the application of a constant force to the ordnance 18 over the entire stroke of the ball drive shaft 24 in 50 milliseconds. This function has been effective through 6 inches of linear travel for a 50 millisecond duration to dissipate the total energy stored. In doing so, the flywheel must be brought to rest in 3.413 revolutions.

The variable pitch groove 68 has a pitch distribution for a linear constant force derived from the rotating flywheel 30 of:

$$x = \frac{2am_{final}^2}{N_o^2}\left(\sqrt{1 - \frac{m}{m_{final}}} - 1\right)^2$$

where x=distance traveled; a=desired linear acceleration; $n_o$=initial radial velocity in rev/sec; m=radial position in fractions of revolutions; and $m_{final}$=total number of revolutions calculated as:

$$m_{final} = 1/2 \, n_o \, t_{max}; \text{ and } t_{max} = \frac{2x}{v_{final}}$$

where:
$v_{final}$=final velocity of acceleration; and
x=total stroke.

Although there is only one theoretical solution for a constant acceleration groove, practically a groove with much different pitch at engagement would be used to allow for appropriate strength of materials to react with initial impulsive forces. Likewise, there is an infinite number of variations in flywheel configuration. For example, to reduce the required pitch and thereby manufacture a more compact drive shaft 24 and accompanying assembly, the speed of the flywheel 30 must be increased. At 12,000 RPM, the total number of revolutions required to dissipate the energy would be 5. The flywheel could be configured as a 2 inch radius, 1 inch thick, and 3.2175 inch high hollow cylinder, that weighed 8.66 pounds or any other infinite number of configurations including a 2.5 inch radius, 0.5 inch thick and 2.1 inch high unit that weighed 4.24 pounds. This latter specification could be used in a two flywheel per system configuration. This would provide an independent force adjustment through simple speed control of the individual flywheels. Thus, the instant invention provides a system allowing for a great variety of adjustments to adapt the system to various environments and situations which cannot be found in prior art systems.

The ball drive shaft 24 includes an outermost and innermost circular groove 70 and 72, respectively, tangent to the outermost and innermost ends of the variable pitch groove 68 and spaced from the outer and inner ends 26, 28 of the ball drive shaft 24 for providing free rotation of the flywheel 30 about the ball drive shaft 24 when the ball 54 is in engagement with the circular grooves 70,72. The circular grooves 70,72 blend into the variable pitch groove 68 to allow entry of the ball 54 into the variable pitch groove 68. A total stroke of the ball drive shaft 24 is essentially 4 inches. At the end of travel, the flywheel 30 will run out of any unspent energy in the groove 72. This configuration of the grooves 68,70,72 provides the system 10 with the ability to engage the flywheel 30 repeatedly at high stored energy levels. This is different than most other methods in that other techniques require continuous engagement of some means of friction clutching or other engagement means at low levels of energy.

The system 10 includes bidirectional latch means for reversibly unlatching and latching the ball drive shaft 24 at a position where the ball drive shaft 24 is retracted within the housing 22 while the flywheel 30 freely rotates about the outermost circular groove 70. The latch means includes a pair of pivotally mounted hooks 74 having pawls 76 biased toward each other by springs 78. The ball drive shaft 24 has a cap 80 extending from the inner end 28 thereof. The cap 80 is engaged by the pawls 76 as the pawls 76 are biased together by the springs 78. Threaded members 82 are threadedly engaged within the cage 38 for allowing access and adjustment of the compressive force of the springs 78 against the hooks 74.

The system 10 includes actuating means for separating the pawls 76 to release the cap 80 from engagement thereby. The actuating means includes an axially reciprocating arm 84 for separating the pawls 76 while abutting against the cap 80 to provide an initial axial impetus to the ball drive shaft 24 and displace the ball drive shaft 24 relative to the ball 54 disposing the ball 54 within the variable pitch groove 68. The ball 54 is initially located within a portion of the circular groove 70 and allowing for free rotation of the flywheel 30 about the ball drive shaft 24. If the shaft is provided with an initial motion by the actuating means, the position of the ball 54 is co-located about the ball drive shaft 24 in a manner which permits entry into the variable pitch groove 68. Once this is accomplished, the ball drive shaft 24 is driven along the axial direction with an accleration determined by the reacting force of the ordnance 18 and the initial energy and rotational speed of the flywheel 30.

The actuating means further includes an actuating member 86 threadedly mounted upon the arm 84. The actuating member 86 has a tapered male end portion 88. The hook members 74 have a tapering inner surface defining a tapered female portion 90 engaged by the male portion 88. Axial movement of the actuating member 86 causes the tapered end portion 88 to engage the female surface 90 of the hooks 74 to separate the hooks 74 thereby releasing the cap 80. The forward movement of the actuating member 86 continues to engage the cap member 80 thereby providing the forward impetus of the shaft 24. Thus, the actuating means provides a lock release mechanism and also initiates the outward axial movement of the ball drive shaft 24.

The actuating means further includes a solenoid 92 for actuating the actuating member 86. The solenoid 92 is secured to the housing 38 by screws 94 mounting the mounting plate 96 of the solenoid 92 on the housing 38.

An annular flange 98 extends radially outwardly from the ball drive shaft 24 at a position between the inner end 28 of the ball drive shaft 24 and the innermost circular groove 72. The system 10 includes a compression spring 100 mounted about the ball drive shaft 24 within the tubular portion 34 of the housing 22 whereby once the ball drive shaft 24 completes the outward travel function and the ball 54 is disposed in the innermost groove 72, the flange 98 is thrust against the spring 100 causing the ball drive shaft 24 to move inwardly while the ball 54 reengages the variable pitch groove 68. In operation, the drive shaft 24 is retained in the housing 22 by the locking means of the instant invention which provides a quick disconnect assembly that is a bidirectional device for both connection and disconnection. The solenoid 92 affects displacement of the spring loaded disconnect pawls 76 of the hooks 74 and the solenoid 92 through the actuating member 86 displaces the ball drive shaft 34 sufficiently to engage the ball 54 into the variable pitch groove 68. Once the ball drive shaft 24 completes its full travel function with the ball 54 located in the innermost circular groove 72, the flange 98 is thrust against the compression spring 100 causing the ball 54 to reengage the variable pitch groove 68. At this time, the energy input means 16 will cause a reverse flywheel rotation sufficient to thrust the ball drive shaft 24 back to the stowed/locked position. During both travel directions, the rotation of the ball drive shaft 24 is restricted by the cam follower 62 riding on the anti-torquing tube 26.

The system 10 includes rotary position sensing means 101 and a tachometer 103 as part of the control means 12 for providing flywheel angular velocity information to permit actuation of the ball drive shaft 24 at a point permitting a smooth transition of the ball 54 from the outer most circular groove 70 into the variable pitch groove 68. The rotary position sensing means 101 may be an optical sensor or a magnetic sensor.

The energy input means 16 may include a linear induction motor 16 operatively connected to the flywheel 30. If the linear induction motor technique is used for powering the flywheel 30, the drive source and energy coupler of the system 10 become a simply round stater and the the flywheel 30 itself is the rotor which receives its thrust through the inner action of the applied field and the induced currents. The flywheel 30 may be constructed as a solid iron core with a thin aluminum conductive plate on the outer surface. The flywheel 30 may include a core comprising about 95% pure tungsten alloy. All other reactive elements, including the housing 22, may be fabricated from high strength stainless steel.

The invention has been described in an illustrative manner, and it is to be understood that the terminology which has been used is intended to be in the nature of words of description rather than of limitation.

Obviously many modifications and variations of the present invention are possible in light of the above teachings. It is therefore, to be understood that within the scope of the appended claims wherein reference numerals are merely for convenience and are not to be in any limiting, the invention may be practiced otherwise that is specifically described.

What is claimed is:

1. An energy storage and release system (10) in combination with an aircraft for ejecting an ordnance from said aircraft, said system (10) comprising: a housing (22) operatively mounted in said aircraft; a driven member (24) supported within said housing (22) for reciprocating movement into and out of said housing (22); energy storage means for storing kinetic energy within said system (10) to move said driven member (24); energy input means (16) for powering said energy storage means; and characterized by clutch means for converting the kinetic energy of said energy storage means to mechanical movement of said driven member (24) and for maintaining constant linear velocity of said mechanical movement as the kinetic energy is dissipated from said energy storage means to a lower level.

2. A system as set forth in claim 1 further characterized by said energy input means (16) including a linear induction motor (16) operatively connected to said flywheel (30).

3. A system and aircraft combination as set forth in claim 1 further characterized by said drive member including drive shaft (24) having an outer end (26) and inner end (28) supported within said housing (22) for reciprocating axial movement into and out of said housing (22); said energy storage means including a flywheel (30) rotatably mounted within said housing (22) and operatively connected to said drive shaft (24) through said clutch means for moving said outer end (26) of said drive shaft (24) axially out of said housing (22) to eject an ordnance (18).

4. A system as set forth in claim 3 further characterized by said flywheel (30) including a solid iron core (71) having a thin aluminum conductive plate (73) on the outer surface thereof.

5. A system as set forth in claim 3 further characterized by said flywheel (30) including a core comprising about 95% pure tungsten alloy.

6. A system as set forth in claim 3 further characterized by including an ordnance adapter (64) mounted on said outer end (26) of said drive shaft (24) and configured to suit a specific ordnance (18), said adapter (64) including shock absorber means (65) for absorbing the shock of said adapter (64) engaging the ordnance (18).

7. A system as set forth in claim 6 further characterized by said aircraft (11) including a rack for releasably securing an ordnance (18) therein, said adapter (64) being operatively connected to said rack for ejecting the ordnance (18) therefrom.

8. A system and aircraft combination as set forth in claim 3 further characterized by said clutch means including a threaded outer surface of said drive shaft (24) defining a ball drive shaft (24) and said flywheel (30) including a central bore (50) extending therethrough and a cage (52) disposed adjacent said bore (50) and a ball (54) rotatably mounted in said cage (52) and having a surface exposed within said bore (50) in contact with said ball drive shaft (24), said system (10) including shaft rotation restricting means for restricting rotation of said ball drive shaft (24) whereby upon actuation of said clutch means rotation of said flywheel (30) drives said ball drive shaft (24) out of said housing (22) as said ball (54) follows said threaded outer surface of said ball drive shaft (24).

9. A system as set forth in claim 8 further characterized by said shaft rotation restricting means including an anti-torquing tube (60) mounted within said housing (22) and a cam follower (62) fixedly secured to said ball drive shaft (24) and slidably engaging said tube (60) for following said tube (60) as said ball drive shaft (24) reciprocally moves within said housing (22).

10. A system as set forth in claim 8 further characterized by said ball drive shaft (24) including a groove (68) defining said threaded outer surface, said groove (68) being a variable pitch groove (68) forming an increasing pitch substantially from said outer end (26) to said inner end (28) for providing a linear constant force transfer from said ball drive shaft (24) to the ordnance (18).

11. An energy storage and release system (10) as set forth in claim 10 further characterized by said variable pitch groove (68) having a pitch distribution for a linear constant force derived from said rotating flywheel (30) of:

$$x = \frac{2am_{final}^2}{N_o^2}\left(\sqrt{1 - \frac{m}{m_{final}}} - 1\right)^2$$

where x=distance traveled; a=desired linear acceleration; $n_o$=initial radial velocity in rev/sec; m=radial position in fractions of revolutions; and $m_{final}$=total number of revolutions calculated as:

$$m_{final} = 1/2\, n_o\, t^{max}; \text{ and } t_{max} = \frac{2x}{v_{final}}$$

where:
$v_{final}$=final velocity of acceleration; and
x=total stroke.

12. A system as set forth in claim 10 further characterized by said ball drive shaft (24) including an outermost and an innermost circular groove (70,72) tangent to the outermost and innermost end of said variable pitch groove (68), respectively, and spaced from said outer and inner ends (26,28) of said ball drive shaft (24) for providing free rotation of said flywheel (30) about 13. A system as set forth in claim 12 further characterized by including rotary position sensing means (101) and a tachometer (103) for providing flywheel angular velocity information to permit actuation of said ball drive shaft (24) at a point permitting a smooth transition of said ball (54) from said outermost circular groove (70) into said variable pitch groove (68).

14. A system as set forth in claim 13 further characterized by said rotary position sensing means (101) being an optical sensor.

15. A system as set forth in claim 13 further characterized by said rotary position sensing means (101) being a magnetic sensor.

16. A system as set forth in claim 12 further characterized by including bidirectional latch means for reversibly unlatching and latching said ball drive shaft (24) at a position where said ball drive shaft (24) is retracted within said housing (22) while said flywheel (30) freely rotates about said innermost circular groove (70).

17. A system as set forth in claim 16 further characterized by including an annular flange (98) extending radially outwardly from said ball drive shaft (24) at a position between said inner end (28) of said ball drive shaft (24) and said innermost circular groove (72), said system (10) including a compression spring (100) mounted about said ball drive shaft (24).

18. A system as set forth in claim 16 further characterized by said latch means including a pair of pivotally mounted hooks (74) having pawls (76) biased towards each other, said ball drive shaft (24) having a cap (80) extending from said inner end (28) thereof and being engaged by said pawls (76) as said pawls (76) are biased together, said system (10) including actuating means for separating said pawls (76) to release said cap (80) from engagement thereby.

19. A system as set forth in claim 18 further characterized by said actuating means including an axially reciprocating arm (84) for separating said pawls (76) while abutting against said cap (80) to provide an initial axial impetus to said ball drive shaft (24) and displace said ball drive shaft (24) relative to said ball (54) disposing said ball (54) within said variable pitch groove (68).

20. A system (10) as set forth in claim 19 further characterized by said actuating means including an actuating member (86) mounted on said reciprocating arm (84) and having a tapered male end portion (88), said hooks (74) having a tapering inner surface defining a tapered female portion (90) engaged by said male portion (88) whereby axial movement of said actuating member (86) causes said tapered male end portion (88) to separate said hooks (74).

21. A system as set forth in claim 20 further characterized by said actuating means including a solenoid (92) for actuating movement of said actuating members (86).

22. An actuator system (10) for storing and releasing energy comprising: a driven member (24); energy storage means for storing kinetic energy within said system (10) to move said driven member (24); and characterized by clutch means for converting the kinetic energy of said energy storage means to mechanical movement of said driven member (24) and for maintaining constant velocity of said mechanical movement as the kinetic energy is dissapated from said energy storage means to a lower level.

23. An actuation system (10) as set forth in claim 22 further characterized by including: a housing (22), said driven member (24) including a shaft (24) having an outer end (26) and an inner end (28) supported within said housing (22) for reciprocating axial movement into and out of said housing (22), and energy input means (16) for powering said energy storage means, said energy storage means including a flywheel (30) rotatably mounted within said housing (22) and operatively connected to said shaft (24) through said clutch means for moving said outer end (26) of said shaft (24) axially out of said housing (22).

24. An actuation system (10) as set forth in claim 23 wherein said clutch means includes a variable pitch groove (68) in said shaft (24) forming an increasing pitch substantially from said outer end (26) to said inner end (28), said flywheel (30) including a central bore (50) extending therethrough and a ball (54) rotatably mounted in said bore (50) and having a surface exposed within said bore (50) in contact with said variable pitch groove (68), said system (10) including shaft rotation restricting means for restricting rotation of said shaft (24) whereby rotation of said flywheel (30) drives said shaft (24) out of said housing (22) as said ball follows said variable pitch groove (68) upon actuation of said clutch means, said variable pitch groove (68) providing linear constant force transfer from said shaft (24).

* * * * *